US012593270B2

(12) United States Patent
Basu Mallick et al.

(10) Patent No.: US 12,593,270 B2
(45) Date of Patent: Mar. 31, 2026

(54) SELECTION ASSISTANCE INFORMATION FOR A NETWORK SLICE

(71) Applicant: Lenovo (Singapore) Pte. Ltd., New Tech Park (SG)

(72) Inventors: Prateek Basu Mallick, Dreieich (DE); Ravi Kuchibhotla, Chicago, IL (US); Joachim Loehr, Wiesbaden (DE); Hyung-Nam Choi, Ottobrunn (DE); Genadi Velev, Darmstadt (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 573 days.

(21) Appl. No.: 17/999,546

(22) PCT Filed: May 21, 2021

(86) PCT No.: PCT/IB2021/054456
§ 371 (c)(1),
(2) Date: Nov. 21, 2022

(87) PCT Pub. No.: WO2021/234673
PCT Pub. Date: Nov. 25, 2021

(65) Prior Publication Data
US 2023/0209453 A1 Jun. 29, 2023

Related U.S. Application Data

(60) Provisional application No. 63/028,510, filed on May 21, 2020, provisional application No. 63/028,511, filed on May 21, 2020.

(51) Int. Cl.
*H04W 48/18* (2009.01)
*H04W 16/24* (2009.01)
*H04W 48/10* (2009.01)

(52) U.S. Cl.
CPC ........... *H04W 48/18* (2013.01); *H04W 16/24* (2013.01); *H04W 48/10* (2013.01)

(58) Field of Classification Search
None
See application file for complete search history.

(56) References Cited

U.S. PATENT DOCUMENTS

| | | | |
|---|---|---|---|
| 5,794,146 | A | 8/1998 | Sevcik et al. |
| 2010/0323698 | A1 | 12/2010 | Rune et al. |

(Continued)

FOREIGN PATENT DOCUMENTS

| | | |
|---|---|---|
| EP | 3474603 A1 | 4/2019 |
| EP | 3570574 A1 | 11/2019 |

(Continued)

OTHER PUBLICATIONS

PCT/IB2021/054455, "Notification of Transmittal of the International Search Report and the Written Opinion of the International Searching Authority, or the Declaration", International Searching Authority, Aug. 31, 2021, pp. 1-28.

(Continued)

*Primary Examiner* — Hong S Cho
(74) *Attorney, Agent, or Firm* — Kunzler Needham & Hilton

(57) ABSTRACT

Apparatuses, methods, and systems are disclosed for receiving selection assistance information corresponding to a preferred network slice. One apparatus includes a processor and a transceiver that receives selection assistance information corresponding to a set of preferred network slices from the mobile communication network, where the selection assistance information includes an indication of at least one preferred network slice starting with a most preferred network slice in a priority order, the selection assistance information further including target cell detection information (Continued)

and/or target cell selection information. The processor performs cell search on a highest priority frequency layer corresponding to the most preferred network slice and selects a cell of the highest priority frequency layer that supports the most preferred network slice based on results of the cell search.

17 Claims, 7 Drawing Sheets

(56) References Cited

U.S. PATENT DOCUMENTS

| | | | |
|---|---|---|---|
| 2019/0289528 A1 | 9/2019 | Lou et al. | |
| 2020/0120547 A1 | 4/2020 | Han et al. | |
| 2022/0287036 A1* | 9/2022 | Mildh | H04W 72/56 |

FOREIGN PATENT DOCUMENTS

| | | | |
|---|---|---|---|
| JP | 20200507255 A | 3/2020 | |
| WO | WO-2017140342 A1 * | 8/2017 | H04W 48/20 |

OTHER PUBLICATIONS

PCT/IB2021/054456, "Notification of Transmittal of the International Search Report and the Written Opinion of the International Searching Authority, or the Declaration", International Searching Authority, Aug. 25, 2021, pp. 1-15.

Intel Corp., "Potential solution and analysis for multicarrier load distribution", 3GPP TSG RAN WG2 Meeting #89bis R2-151185, Apr. 20-24, 2015, pp. 1-7.

Huawei et al., "Slice Availability for Cell Reselection", 3GPP TSG-RAN WG2 Meeting#101 R2-1802261, Feb. 26-Mar. 2, 2018, pp. 1-3.

Gemalto N.V., "Considering slice availability for inter-frequency cell re-selection", 3GPP TSG-RAN WG2 Meeting #101 R2-1802543, Feb. 26-Mar. 2, 2018, pp. 1-3.

Huawei, "Slice aware Idle mode mobility", 3GPP TSG-RAN3 Meeting #99bis R3-181895, Apr. 16-20, 2018, pp. 1-2.

CMCC, "Allowed NSSAI Indication to NG-RAN", 3GPP TSG-RAN WG3 #99bis R3-182009, Apr. 16-20, 2018, pp. 1-3.

China Telecomm, "On Allowed NSSAI Usage", 3GPP TSG-RAN WG3#100 R3-182925, May 21-25, 2018, pp. 1-3.

Motorola Mobility et al., "KI #7, New Sol: Preferred frequency bands in Configured NSSAI", 3GPP TSG-SA WG2 Meeting #139 E (e-meeting) S2-2004207, Jun. 1-12, 2020, pp. 1-3.

Lenovo et al., "KI #7, Sol #30: Update to remove Ed. Notes", 3GPP TSG-SA WG2 Meeting #140 E (e-meeting) S2-2005182, Aug. 19-Sep. 2, 2020, pp. 1-3.

3GPP, "3rd Generation Partnership Project; Technical Specification Group Services and System Aspects; System architecture for the 5G System (5GS); Stage 2 (Release 16)", 3GPP TS 23.501 V16.3.0, Dec. 2019, pp. 1-417.

3GPP, "3rd Generation Partnership Project; Technical Specification Group Services and System Aspects; Procedures for the 5G System (5GS); Stage 2 (Release 16)", 3GPP TS 23.502 V16.3.0, Dec. 2019, pp. 1-558.

3GPP, "3rd Generation Partnership Project; Technical Specification Group Services and System Aspects; Policy and charging control framework for the 5G System (5GS); Stage 2 (Release 16)", 3GPP TS 23.503 V16.3.0, Dec. 2019, pp. 1-112.

3GPP, "3rd Generation Partnership Project; Technical Specification Group Radio Access Network; NR; Base Station (BS) radio transmission and reception (Release 16)", 3GPP TS 38.104 V16.2.0, Dec. 2019, pp. 1-239.

3GPP, "3rd Generation Partnership Project; Technical Specification Group Radio Access Network; NR; Radio Resource Control (RRC) protocol specification (Release 15)", 3GPP TS 38.331 V15.8.0, Dec. 2019, pp. 1-532.

* cited by examiner

400

700

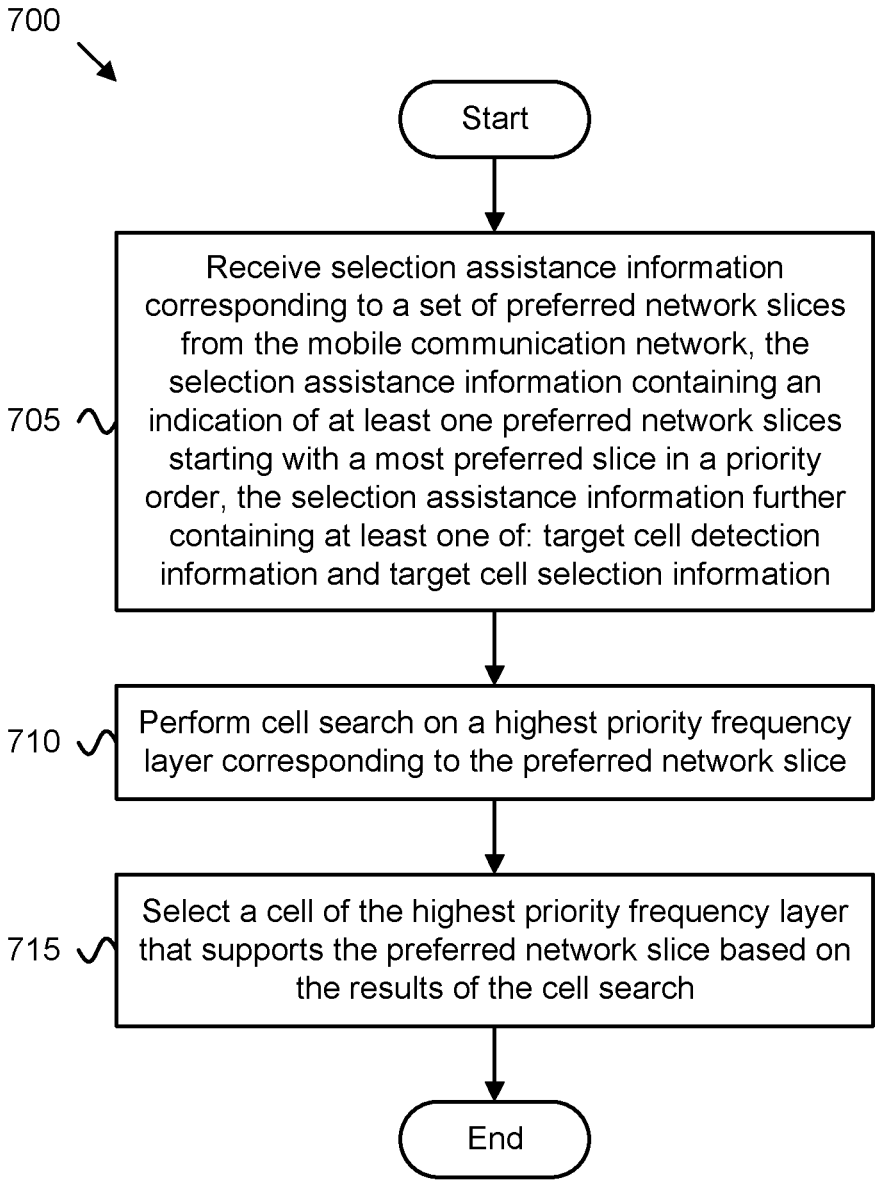

Start

705 ∿ Receive selection assistance information corresponding to a set of preferred network slices from the mobile communication network, the selection assistance information containing an indication of at least one preferred network slices starting with a most preferred slice in a priority order, the selection assistance information further containing at least one of: target cell detection information and target cell selection information 710 ∿ Perform cell search on a highest priority frequency layer corresponding to the preferred network slice 715 ∿ Select a cell of the highest priority frequency layer that supports the preferred network slice based on the results of the cell search End

FIG. 7

SELECTION ASSISTANCE INFORMATION FOR A NETWORK SLICE

CROSS-REFERENCE TO RELATED APPLICATIONS

This application claims priority to U.S. Provisional Patent Application No. 63/028,510 entitled "NETWORK-AS-SISTED OPTIMAL SLICE SELECTION IN 5G SYSTEM" and filed on May 21, 2020 for Prateek Basu Mallick, Ravi Kuchibhotla, Joachim Loehr, Hyung-Nam Choi, and Genadi Velev, which application is incorporated herein by reference. This application also claims priority to U.S. Provisional Patent Application No. 63/028,511 entitled "UE-BASED OPTIMAL SLICE SELECTION IN 5G SYSTEM" and filed on May 21, 2020 for Prateek Basu Mallick, Ravi Kuchib-hotla, Joachim Loehr, Genadi Velev, and Hyung-Nam Choi, which application is incorporated herein by reference.

FIELD

The subject matter disclosed herein relates generally to wireless communications and more particularly relates to receiving selection assistance information corresponding to a preferred network slice.

BACKGROUND

In certain wireless communication systems, a network operator may prefer that a user equipment ("UE") camp on a cell on a first carrier providing coverage, but establish a Radio Resource Control ("RRC") Connection on a different cell on a second carrier supporting Slice 'x' (alternatively, supporting service 'x') with minimum delay as soon upper layers initiate a Service Request procedure for the Slice/service 'x'. However, monitoring separate radio carriers increases power consumption at the UE.

BRIEF SUMMARY

Disclosed are procedures for receiving selection assistance information corresponding to a preferred network slice. Said procedures may be implemented by apparatus, systems, methods, or computer program products.

One method of a User Equipment device ("UE") includes receiving selection assistance information corresponding to a set of preferred network slices from the mobile communication network, where the selection assistance information contains an indication of at least one preferred network slice starting with a most preferred network slice in a priority order, the selection information further containing at least one of: target cell detection information and target cell selection information. The method includes performing cell search on a highest priority frequency layer corresponding to the most preferred network slice and selecting a cell of the highest priority frequency layer that supports the most preferred network slice based on results of the cell search.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 7 is a flowchart diagram illustrating one embodiment of a first method for receiving selection assistance information corresponding to a preferred network slice.

DETAILED DESCRIPTION

Figure 1:
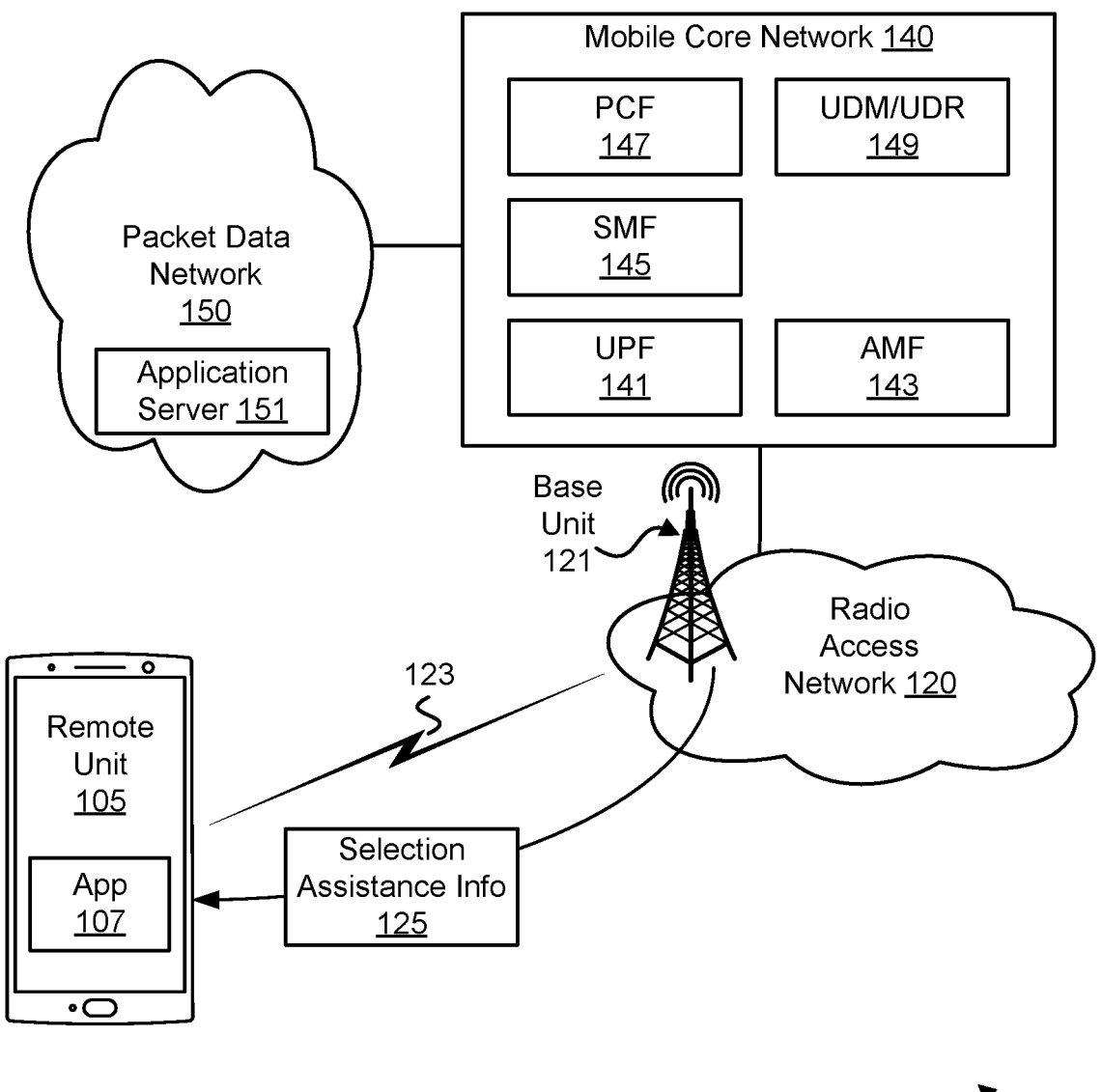
FIG. 1 is a schematic block diagram illustrating one embodiment of a wireless communication system for receiving selection assistance information corresponding to a preferred network slice.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including." "comprising." "having." and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code.

This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for receiving selection assistance information corresponding to a preferred network slice. A mobile communication network operator may prefer that a User Equipment ("UE") camp on a cell on carrier 'f1' providing coverage but establish an RRC Connection on a different cell on carrier 'f2' supporting Slice/service 'x' with minimum delay as soon upper layers initiate a Service Request procedure for the Slice/service 'x'. From a UE perspective, it will be essential to minimize power consumption during the above procedure while ensuring the best user experience.

In some embodiments, the UE receives a list of frequencies for each of the slices in the allowed slice list when successfully registering to the network and/or the UE receives a list of supported frequencies for each of the slices in the rejected slice list when successfully (or otherwise) registering to the network. Note that a frequency for a network slice may be within a different radio band (i.e., defined frequency range) than the radio band of the serving cell. Accordingly, a "frequency for a network slice" as used herein refers to a frequency/band combination (e.g., as defined in 3GPP TS 38.104). In certain embodiments, the radio band may be implied. In other embodiments, the radio band may be explicitly indicated.

However, a UE in 'mode d' operation (as described in 3GPP TS 23.501, section 5.15.9) may not include a NSSAI (Slice info) while initiating the registration procedure. Additionally, the above embodiments do not help for initial cell selection case when the UE has not yet registered in the current network. Further, the above embodiments do not work if the network does not provide the said slice/frequency mapping as a result (i.e., output) of the registration procedure.

Apart from the above demerits, if the slice/frequency mapping (provided during the registration procedure) is not homogeneous across the entire registration area (i.e., Tracking Areas ("TA") list signaled to the UE), then the UE upon moving to other parts in the provided TA list cannot be sure if it can still find the Slice supported on the indicated frequency. Here, the registration area may be indicated by a TA list signaled to the UE.

In certain embodiments, the network may indicate a frequency for a network slice using a RedirectedCarrierInfo in RRCRelease message (e.g., according to 3GPP TS 38.331). However, such messaging is only applicable for RRC Connected UEs. Moreover, signaling RedirectedCarrierInfo in RRCRelease message is typically used due to cell congestion situation. Therefore, it will not guarantee that the redirection is indeed for slice/service reason.

The below described solutions remove dependency on UE Non-Access Stratum ("NAS") registration procedures to signal frequency for a network slice. The below described solutions also remove the uncertainty around existing dedicated as well as broadcast solutions by developing new signaling, a new procedure and even by implementing UE based solutions.

In various embodiments, the network provides selection assistance information to the UE to aid in the UE's cell search (e.g., detection, measurement and evaluation) for a target cell that supports a particular slice. The selection assistance information enables the UE to quickly find a cell that supports a desired slice and camp on it in order to initiate a service request (or registration) with minimum delay once triggered.

FIG. 1 depicts a wireless communication system 100 for receiving selection assistance information corresponding to a preferred network slice, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the 5G system specified in the Third Generation Partnership Project ("3GPP") specifications. For example, the RAN 120 may be a Next Generation Radio Access Network ("NG-RAN"), implementing New Radio ("NR") Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 140. As described in greater detail below, the base unit(s) 121 may provide a cell operating using a first carrier frequency and/or a cell operating using a second frequency. Cells using the first carrier frequency may form a first frequency layer, while cells using the second carrier frequency may form a second frequency layer.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QOS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR operation on unlicensed spectrum (referred to as "NR-U"), the base unit 121 and the remote unit 105 communicate over unlicensed (i.e., shared) radio spectrum.

In one embodiment, the mobile core network 140 is a 5GC or an Evolved Packet Core ("EPC"), which may be coupled to a packet data network 150, like the Internet and private data networks, among other data networks. A remote unit 105 may have a subscription or other account with the mobile core network 140. In various embodiments, each mobile core network 140 belongs to a single mobile network operator ("MNO"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Policy Control Function ("PCF") 147, a Unified Data Management function ("UDM") and a User Data Repository ("UDR"). Although specific numbers and types of network functions are depicted in FIG. 1, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network (DN), in the 5G architecture. The AMF 143 is responsible for termination of NAS signaling, NAS ciphering & integrity protection, registration management, connection management, mobility management, access authentication and authorization, security context management. The SMF 145 is responsible for session management (i.e., session establishment, modification, release), remote unit (i.e., UE) IP address allocation & management, DL data notification, and traffic steering configuration of the UPF 141 for proper traffic routing.

The PCF 147 is responsible for unified policy framework, providing policy rules to CP functions, access subscription information for policy decisions in UDR. The UDM is responsible for generation of Authentication and Key Agreement ("AKA") credentials, user identification handling, access authorization, subscription management. The UDR is a repository of subscriber information and can be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include a Network Repository Function ("NRF") (which provides Network Function ("NF") service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), an Authentication Server Function ("AUSF"), or other NFs defined for the 5GC. When present, the AUSF may act as an authentication server and/or authentication proxy, thereby allowing the AMF 143 to authenticate a remote unit 105. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. For example, one or more network slices may be optimized for enhanced mobile broadband ("eMBB") service. As another example, one or more network slices may be optimized for ultra-reliable low-latency communication ("URLLC") service. In other examples, a network slice may be optimized for machine-type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed. In various embodiments, a first set of set of network slices may be prioritized for use with a first carrier frequency, while a second set of network slices may be prioritized for use with a second carrier frequency. As discussed in greater detail below, the RAN 120 sends selection assistance information 125 to a remote unit 105 (i.e., sent via the base unit 121) so that the remote unit 105 selects a specific combination of frequency layer (i.e., operating carrier frequency) and preferred network slice.

While FIG. 1 depicts components of a 5G RAN and a 5G core network, the described embodiments for performing receiving selection assistance information corresponding to a preferred network slice apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In the following descriptions, the term "RAN node" is used for the base station but it is replaceable by any other radio access node, e.g., gNB, eNB, Base Station ("BS"), Access Point ("AP"), etc. Further, the operations are described mainly in the context of 5G NR. However, the proposed solutions/methods are also equally applicable to other mobile communication systems supporting receiving selection assistance information corresponding to a preferred network slice.

Figure 2:
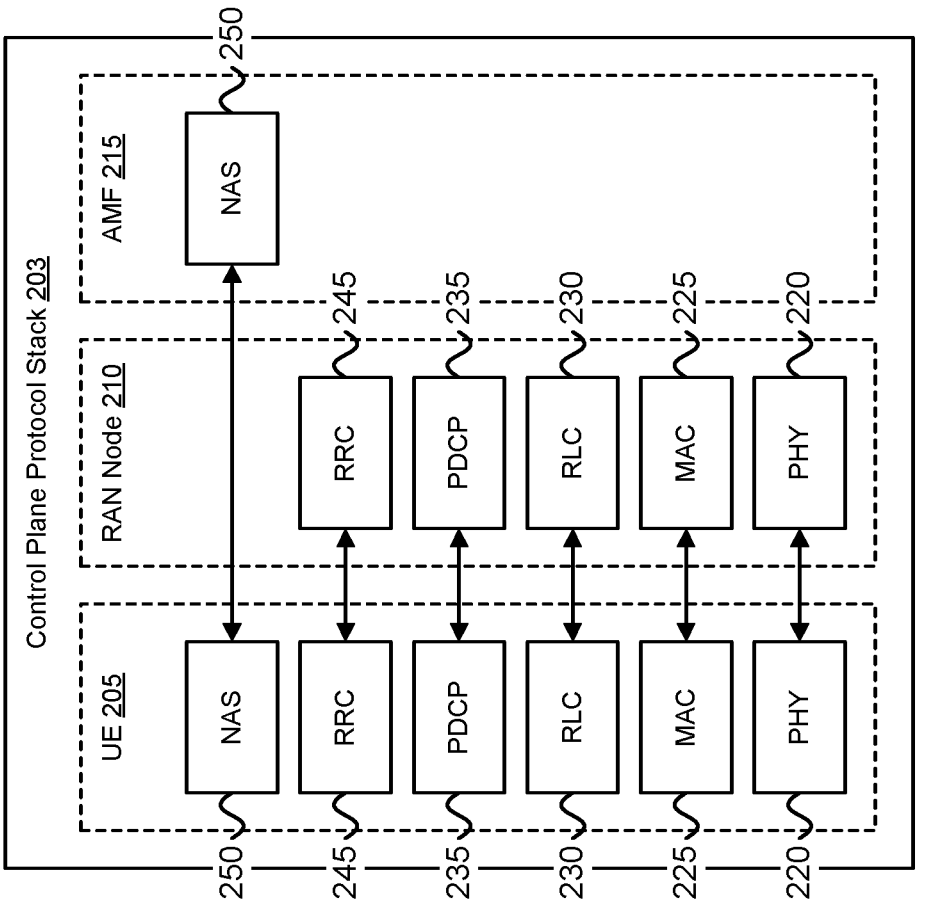
FIG. 2 is a block diagram illustrating one embodiment of a 5G New Radio ("NR") protocol stack.
Figure 2:
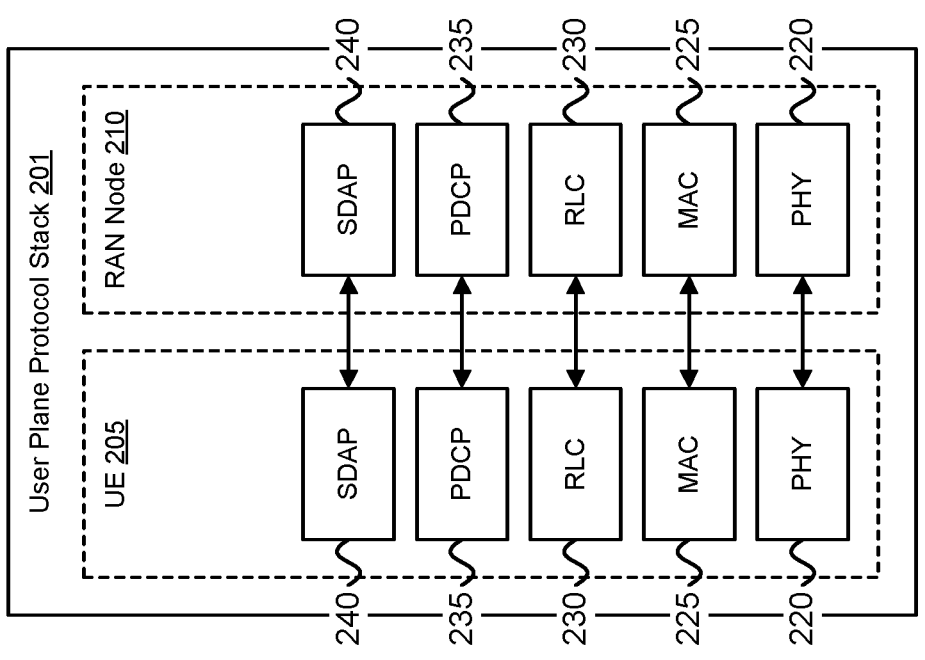

FIG. 2 depicts a NR protocol stack 200, according to embodiments of the disclosure. While FIG. 2 shows the UE 205, the RAN node 210 and an AMF 215 in a 5G core network ("5GC"), these are representative of a set of remote units 105 interacting with a base unit 121 and a mobile core network 140. As depicted, the protocol stack 200 comprises a User Plane protocol stack 201 and a Control Plane protocol stack 203. The User Plane protocol stack 201 includes a physical ("PHY") layer 220, a Medium Access Control ("MAC") sublayer 225, the Radio Link Control ("RLC") sublayer 230, a Packet Data Convergence Protocol ("PDCP") sublayer 235, and Service Data Adaptation Protocol ("SDAP") layer 240. The Control Plane protocol stack 203 includes a physical layer 220, a MAC sublayer 225, a RLC sublayer 230, and a PDCP sublayer 235. The Control Plane protocol stack 203 also includes a Radio Resource Control ("RRC") layer 245 and a Non-Access Stratum ("NAS") layer 250.

The AS layer (also referred to as "AS protocol stack") for the User Plane protocol stack 201 consists of at least SDAP, PDCP, RLC and MAC sublayers, and the physical layer. The AS layer for the Control Plane protocol stack 203 consists of at least RRC, PDCP, RLC and MAC sublayers, and the physical layer. The Layer-2 ("L2") is split into the SDAP, PDCP, RLC and MAC sublayers. The Layer-3 ("L3") includes the RRC sublayer 245 and the NAS layer 250 for the control plane and includes, e.g., an Internet Protocol ("IP") layer and/or PDU Layer (not depicted) for the user plane. L1 and L2 are referred to as "lower layers," while L3 and above (e.g., transport layer, application layer) are referred to as "higher layers" or "upper layers."

The physical layer 220 offers transport channels to the MAC sublayer 225. The physical layer 220 may perform a Clear Channel Assessment and/or Listen-Before-Talk ("CCA/LBT") procedure using energy detection thresholds, as described herein. In certain embodiments, the physical layer 220 may send a notification of UL Listen-Before-Talk ("LBT") failure to a MAC entity at the MAC sublayer 225. The MAC sublayer 225 offers logical channels to the RLC sublayer 230. The RLC sublayer 230 offers RLC channels to the PDCP sublayer 235. The PDCP sublayer 235 offers radio bearers to the SDAP sublayer 240 and/or RRC layer 245. The SDAP sublayer 240 offers QoS flows to the core network (e.g., 5GC). The RRC layer 245 provides for the addition, modification, and release of Carrier Aggregation and/or Dual Connectivity. The RRC layer 245 also manages the establishment, configuration, maintenance, and release of Signaling Radio Bearers ("SRBs") and Data Radio Bearers ("DRBs").

The NAS layer 250 is between the UE 205 and the 5GC 215. NAS messages are passed transparently through the RAN. The NAS layer 250 is used to manage the establishment of communication sessions and for maintaining continuous communications with the UE 205 as it moves between different cells of the RAN. In contrast, the AS layer is between the UE 205 and the RAN (i.e., RAN node 210) and carries information over the wireless portion of the network.

Figure 3:
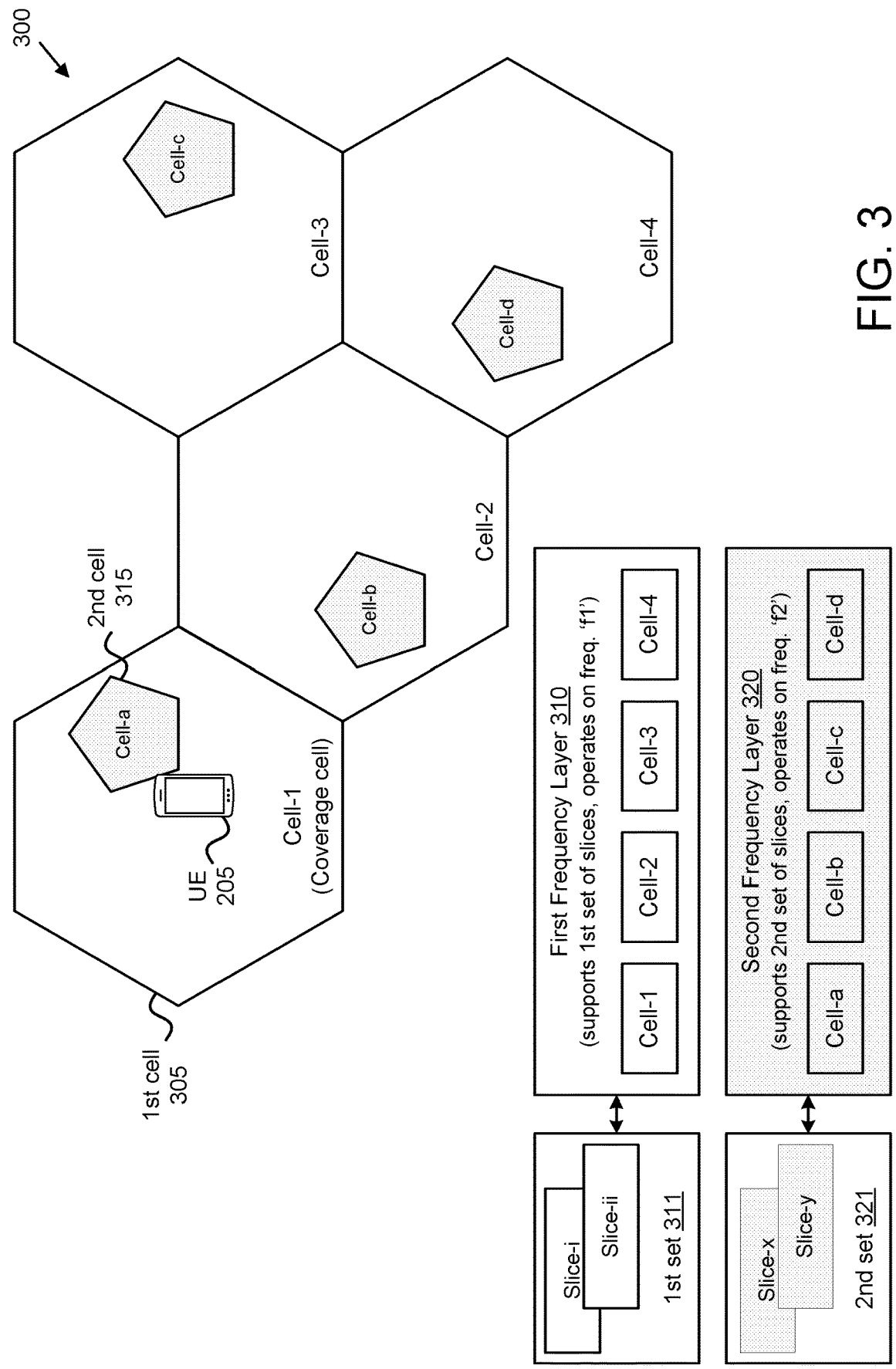
FIG. 3 is a diagram illustrating one embodiment of a RAN deployment.

FIG. 3 depicts an example network deployment 300 of a RAN portion of mobile communication network, according to embodiments of the disclosure. The RAN 301 may support multiple frequency layers, as described below in further detail. In the depicted embodiment, the UE 205 is in the coverage area of a first cell 305 which operates on a first frequency. Here, the first cell 305 is part of a first frequency layer 310 which supports a first set of network slices 311. For example, a slice that supports a first service 'i' (depicted as "slice-i") and a slice that supports a second service 'ii' (depicted as "slice-ii") may be part of the first set of network slices 311. The first cell 305 may be representative of any cell on the first frequency layer 310.

As shown, the UE 205 is also within the coverage area of a second cell 315 which operates on a second frequency different than the first frequency. Here, the second cell 315 is part of a second frequency layer 320 which supports a second set of network slices 321, different than the first set 311. For example, a slice that supports a first service 'x' (depicted as "slice-x") and a slice that supports a second service 'y' (depicted as "slice-y") may be part of the second set of network slices 321. Here, the second cell 315 may be representative of any cell on the second frequency layer 320.

In one embodiment, the first frequency layer 310 does not support any of the second set of network slices 321. In other embodiments, the cells of the first frequency layer 310 may support one or more of the slices in the second set of network slices 321; however, the mobile communication network may prefer that the slices of the second set of network slices 321 be used in the second frequency, where possible.

In the depicted embodiment, it is assumed that the network operator prefers that the UE 205 camp of a carrier of the first frequency layer 310, e.g., due to the first frequency layer providing a greater geographic coverage. As used herein, "camping" refers to behavior of the UE 205 in the RRC Idle state where the UE 205 has selected a cell and is prepared to initiate a RRC connection or receive a broadcast service. Note that while in the RRC Idle state, the UE 205 is switched on but does not have any established RRC connection with the mobile communication network.

In some embodiments, when the UE 205 transitions from the RRC connected state to the RRC idle state, the UE 205 selects a cell to camp on. This cell may be a cell on a frequency that is indicated in an RRC connection release message. When camping on a cell, the UE 205 may monitor and receive system information that is broadcast in the cell. The UE 205 also performs on the coverage cell (and neighboring cells) when camping on the cell. Further, the UE 205 may perform cell reselection while camping on the coverage cell.

However, the UE 205 may have a preferred slice (also referred to as a 'desired' slice) that is part of the second set of network slices 321. As used herein, a "preferred slice" or "desired slice" refers to a slice that is part of allowed slice list, rejected slice list, configured slice list, etc. In various embodiments, the mobile communication network knows about the "desired" slice list, e.g., based on a registration procedure performed by the UE 205. In various embodiments, the UE 205 assumes that the first entry in a dedicated signaled cellReselectionPriorities list corresponds to its most desired Slice. For example, the most desired slice may be a highest priority slice. The cellReselectionPriorities ("CRP") list, also referred to as an absolute frequency priority list, includes a list of frequency priorities, for example a set of ARFCN (Absolute Radio Frequency Channel Number) values and their corresponding priorities.

The priority among the slices may also be indicated explicitly to indicate to the UE the most preferred slice and then the next lower preferred slice and so on. Alternatively, the indication of the slice priorities may also be accomplished implicitly, e.g., by listing the slices in the priority order matching the order of their appearance in the assistance information list—e.g., where the first appearing slice is the most preferred slice and then the next listed preferred slice is the next most preferred slice, and so on.

In order to minimize delay in connecting to the second cell 315, the UE 205 performs parallel maintenance of the second frequency layer 320. Thus, even though the UE 205 considers itself to be camped on the first frequency layer (e.g., frequency 'f1'), whenever the UE 205 requires a connection for data coming from the upper layers for the service 'x', the parallel maintenance allows the UE 205 to very quickly establish an RRC connection with the second cell 315. To conserve power, the UE 205 should not be required to continuously monitor the first frequency layer (i.e., frequency 'f2'). The solutions described below provide optimization between power consumption at the UE 205 (which is camping on cell 305) and a time to establish a RRC connection with the second cell 315.

The first frequency layer 310 is a collection of cells (or cell sectors) that operate on the same carrier frequency, i.e., the first frequency 'f1'. In the depicted embodiment, the first frequency layer includes the following cells: cell-1, cell-2, cell-3, and cell-4. Here, the first set of network slices 311 is prioritized for use with frequency 'f1'. Therefore, the UE 205 may be configured to camp on the first frequency layer 310 when within a certain geographic area. In some embodiments, the geographic coverage area of cells in the first frequency layer 310 may be contiguous.

The second frequency layer 320 is a second collection of cells (or cell sectors) that operate on the same carrier frequency, i.e., the second frequency 'f2'. In the depicted embodiment, the first frequency layer includes the following cells: cell-a, cell-b, cell-c, and cell-d. Here, the second set of network slices 321 is prioritized for use with frequency 'f2'. In the depicted embodiment, the geographic coverage area of cells of the second frequency layer 320 is not contiguous. However, in other embodiments one or more cells of the second frequency layer 320 may have contiguous coverage areas.

According to a first solution, the network provides selection assistance information to the UE 205. Here, the selection assistance information aids the UE's cell search (e.g., detection, measurement and evaluation) for a target cell that supports a particular slice (i.e., for the second cell 315). The selection assistance information enables the UE 205 to quickly find a cell that supports a desired slice and camp on it in order to initiate a service request (or registration) with minimum delay once triggered.

As used herein, cell search refers to the combined procedures of detection/scanning, measurement and evaluation. Detection (also known as scanning) refers to tuning to a specific carrier frequency (e.g., 'f1' or 'f2') and identifying candidates for measurement. At the measurement phase, the UE 205 measures signal strengths, such as Reference Signal Received Power ("RSRP") and/or Reference Signal Received Quality ("RSRQ"), of the candidate cells. At the evaluation phase, the UE 205 checks the cell selection criteria using the measurement results.

As used herein, cell selection refers to selecting a suitable cell using information gathered during cell search and/or using previously stored information. Here, the UE 205 selects the cell using cell selection criteria, such as signal strength, signal quality, service type, etc. In certain embodiments, the UE 205 performs cell selection as described in 3GPP TS 36.304.

In one implementation of the first solution, the network provides a mapping between the desired slice and one or more frequency layers that supports the desired slice (or its equivalent). For each of indicated frequencies its corresponding priority is also indicated. In another implementation, in addition to (or instead of) the frequency information, the UE 205 is provided with information to location (i.e., detect) a target cell and/or information to bias the UE's selection (or reselection) to a target cell.

Regarding information to locate (i.e., detect) a target cell (also, referred to herein as information from category 'a'), the information provided is used to help the UE 205 to detect the target cell by avoiding a more comprehensive scan of a frequency band. These include the following information elements ("IEs"):

FreqBandIndicatorNR::=INTEGER (1 . . . 1024)
Frequency InfoDL::=SEQUENCE {
  absoluteFrequencySSB ARFCN-ValueNR
  frequency BandList MultiFrequency BandListNR,
  absoluteFrequencyPointA ARFCN-ValueNR,
  scs-SpecificCarrierList SEQUENCE (SIZE (1 . . .
    maxSCSs)) OF SCS-SpecificCarrier,
}
Frequency InfoDL-SIB::=SEQUENCE {
  frequency BandList MultiFrequency BandListNR-SIB,
  offsetToPointA INTEGER (0 . . . 2199),
  scs-SpecificCarrierList SEQUENCE (SIZE (1 . . .
    maxSCSs)) OF SCS-SpecificCarrier
}

These contents of these IEs are defined in 3GPP TS 38.331. The UE 205 uses the information in the contents to "locate" the radio cell that supports the desired slice (i.e., the second cell 315).

Regarding information to bias UE's (re) selection to a target cell (also, referred to herein as information from category 'b'), here information to detect, measure and evaluate a target cell for a particular Slice support may be provided. In one embodiment, the information to bias UE's (re)selection to a target cell may contained inside a System Information Block ("SIB") such as SIB4, e.g., as defined in 3GPP TS 38.331, or some subsets thereof.

In some embodiments of the first solution, the network may provide multiple sets of information from category 'a' or 'b'. For example, the network may provide the UE 205 with one set of selection assistance information for an eMBB-optimized slice, another set of selection assistance information for a URLLC-optimized slice, another set of selection assistance information for a mMTC-optimized slice, etc.

In some embodiments of the first solution, the selection assistance information may be provided to the UE 205 by using broadcast signaling, e.g., by signaling a list of slices/services supported in the geography and the corresponding information from category 'a' or 'b' described previously. As described above, the network may provide the UE 205 with multiple sets of selection assistance information, e.g., one for an eMBB-optimized slice, another for a URLLC-optimized slice, another for a mMTC-optimized slice, etc.

"Geography" refers to adjoining cells, TA(s) (Tracking Area), etc. As an example, the RAN node 210 may broadcast in SIB4 (or in another SIB) a cellReselectionPriority-p1 for a first frequency supporting slice 'x' and another cellReselectionPriority-p2 for a second (same or different) frequency supporting slice y. A UE interested in slice 'x' may reselect to the corresponding frequency using cellReselectionPriority-p1.

As used herein, cell reselection refers to the UE 205 having already selected a cell and determining to performing cell selection anew, e.g., in response to a trigger condition. In one embodiment, the trigger condition is expiry of a timer. In another embodiment, the trigger condition is RSRP and/or RSRQ measurements of the current selected cell deteriorating (e.g., dropping below a threshold value). During cell reselection, the UE 205 performs the above described steps of cell selection. In certain embodiments, the UE 205 again performs cell search during the cell reselection process. In some embodiments, cell reselection may evaluate additional criteria not evaluated during the initial cell selection. In some embodiments, the UE 205 considers a CellReselectionPriority for Frequency Priority of NR frequency (i.e., element 'FreqPriorityNR') and/or CellReselectionPriority for Frequency Priority of Evolved Universal Terrestrial Radio Access ("EUTRA") frequency (i.e., element 'FreqPriorityEUTRA') when performing cell reselection.

In some embodiments, the selection assistance information is provided to the UE 205 by using dedicated signaling (e.g., RRC signaling). Here, the following signaling enhancements are may be used:

In certain embodiments, the selection assistance information may be provided via RRC release signaling, e.g., using an RRCRelease message. Here, the RAN node 210 may take into account the allowed slice list for a particular UE (i.e., the UE 205) and signal cell reselection priorities ("CRP"), e.g., information from category 'a' or 'b', if the desired slice/service is not supported in the cell. In such embodiments, the list of slices/services supported in the geography includes supported slice(s) per entry (frequency) in a cell-ReselectionPriorities list.

The UE 205 examines this list of supported slices/services and select a highest priority frequency that supports its most desired slice and uses the corresponding reselection parameter to (re) select while transitioning to RRC Idle and/or when already in RRC Idle. In one example scenario, the UE 205 may find more than one Suitable cell on the selected frequency. but the cells belong to different Tracking Areas. As discussed in greater detail below, the Network Slices supported on these different cells/TAs may be different. If the UE 205 has a choice of two or more suitable cells on the same frequency—with different slice support, in one implementation the UE 205 selects Cell according to Best radio cell principle (i.e., selects the best/strongest cell on the selected frequency). In another implementation, the UE 205 selects a Cell that is corresponding to the highest priority combination of desired slice and frequency.

In another implementation if the Cell according to Best radio cell principle on the highest priority frequency of the most desired slice does not support the most desired slice, then the UE 205 selects the next highest priority frequency and repeats the procedure for the most desired slice. If there's no other frequency that supports the most desired slice, then the UE 205 moves to the next most desired slice, i.e., to a slice whose priority is just lower than the highest priority/most desired network slice. In certain embodiments, the UE 205 may have a preferred slice (also referred to as a 'desired' slice) that is part of the second set of network slices 321.

As used herein, a "preferred slice" or "desired slice" refers to a slice that is part of allowed slice list, rejected slice list, configured slice list, etc. In various embodiments, the mobile communication network knows about the "desired" slice list, e.g., based on a registration procedure performed by the UE 205. In various embodiments, the UE 205 assumes that the first entry in a dedicated signaled cellReselectionPriorities list corresponds to its most desired Slice. For example, the most desired slice may be a highest priority slice.

As a further aspect, there may be other reasons to provide priorities (e.g., cRP) using dedicated signaling. However, the UE 205 may not know the reason for the RRCRelease message. As such, the UE 205 may initiate selection from the first entry—which may not correspond to its most desired slice. A "reason" can be added in the said cRP list, e.g., Slice, to distinguish the reason for providing the CRP (cell reselection priority).

In certain embodiments, the selection assistance information may be provided via RRC redirection signaling, e.g., using RedirectedCarrierInfo in a RRCRelease message, in order to move the UE 205 to a frequency where the UE 205 may find its desired slice. However, signaling RedirectedCarrierInfo in RRCRelease message is also very likely to happen due to a cell congestion situation. Therefore, RedirectedCarrierInfo alone will not guarantee to the UE 205 that the redirection signaling is indeed for slice/service reason.

As one solution, the network may explicitly signal when the RedirectedCarrierInfo is to redirect the UE 205 to a desired slice/service and not for other reasons (such as cell congestion). If the RedirectedCarrierInfo is not indicated as being for slice selection reasons, then the UE 205 may ignore the information and instead proceed with reselection to a frequency based on its stored information, if any.

As another solution, a new release cause ("reselection-to-desired/allowed-slice" or like) can be used for this purpose. As another solution, if the slice information is not sent alongside the above cRP or other parameter, the UE 205 assumes that the first entry in the dedicatedly signaled cellReselectionPriorities list corresponds to its most desired slice. Here, the UE 205 starts cell selection procedure on the first entry.

Figure 4:
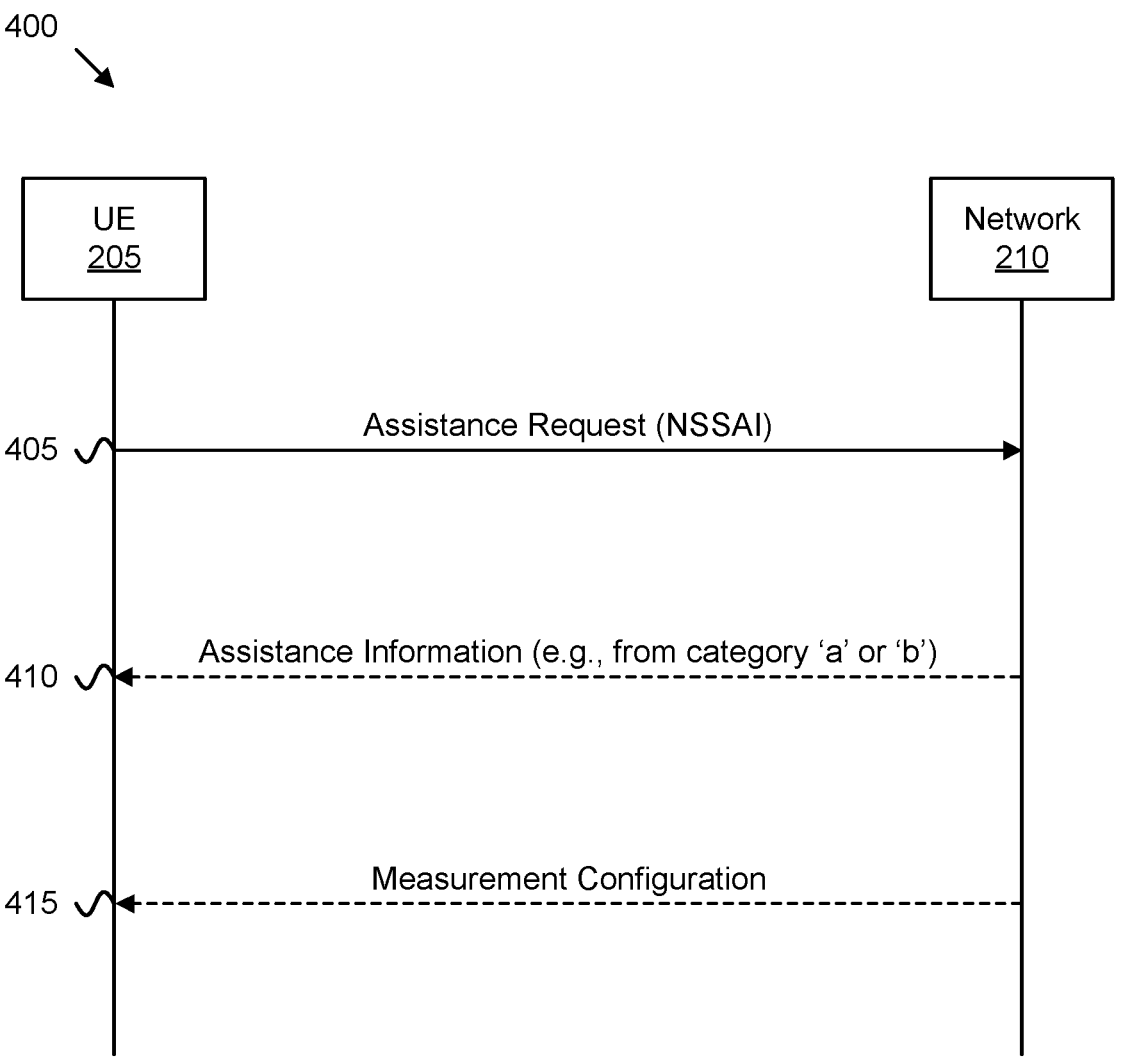
FIG. 4 is a call-flow diagram illustrating one embodiment of a procedure for receiving selection assistance information corresponding to a preferred network slice.

FIG. 4 depicts a procedure 400 (i.e., an RRC procedure) for a UE 205 to receive selection assistance for a desired network slice, according to embodiments of the disclosure. The procedure 400 is performed by a UE 205 and a network entity 401. The network entity 401 shown here may be an entity in the RAN 120 and/or the mobile core network 140 that decides on the desired slice and provides selection assistance back to the UE 205. As described above, the desired slice may be a slice that is part of allowed slice list, rejected slice list, configured slice list, or similar list, where the network entity 401 may know about the "desired" slice list of the UE 205.

The procedure 400 may be a new RRC procedure that is used wherein the UE 205 uses dedicated signaling to query for assistance in finding a cell/frequency that supports the desired slice of the UE 205.

At Step 1, the UE 205 sends a Provide Assistance request to the network entity 401 (see messaging 405). Said request message may include a NSSAI containing one or more desired network slices.

At Step 2, the network entity 401 provides selection assistance information to the UE 205, e.g., in an RRC message (see messaging 410). Here, the selection assistance information may be in the form of information from category 'a' (i.e., information to detect a target cell) or category 'b' (i.e., information to bias the UE's selection/reselection to a target cell).

At Step 3, the network entity 401 configures the UE 205 with required radio measurements for handover to a target cell (i.e., second cell 315) that supports the desired slice (see messaging 415).

According to a second solution, the UE 205 receives selection assistance information during a NAS registration procedure. In embodiments of the second solution, a registration accept message includes the list of allowed NSSAI and the supported frequencies all within the same TA list given to the UE 205 as part of the NAS registration procedure.

The UE 205 may then remain camped on the first frequency layer 310 as the default carrier based on the operator's preference as stated above, but only as long as there is no reasonable coverage from the second frequency layer 320 which supports the desired slice identified by NSSAI (i.e., Identity A). The UE 205 continues to perform cell search (i.e., keeps scanning for a better cell), even ignoring the radio condition of the serving cell (i.e., first cell 305).

When the UE 205 discovers a cell of the second frequency layer 320, then it may camp on the second frequency layer 320. This is done because the desired slice identified by NSSAI (i.e., Identity A) is supported on the second frequency layer 320 and is included in the allowed slice list in the registration accept message.

In some embodiments of the second solution, the network may provide with the UE 205 distinct and specific reselection parameters in order to aid the UE 205 to move over to coverage of the second frequency layer 320 sooner than it normally would if the assistance containing reselection parameters of the second frequency layer (F2) was not provided for the desired slice. This ensures minimal battery consumption and extends the potential duration during which the UE 205 may benefit from service on the second frequency layer.

According to a third solution, the network indicates to the UE 205 whether the provided selection assistance information is valid across the entire registration area (i.e., TA list signaled to the UE 205). For example, the network may indicate whether the provided slice information mapping is homogeneous across the entire registration area or not. In some embodiments, the network defines a validity area referred to as a "RAN Slice area", wherein the mapping is valid within he RAN Slice area. In certain embodiments, the RAN Slice area is provided to the UE 205 during the registration procedure, is defined and signaled to the UE. For example, the UE 205 is sent an Allowed NSSAI, e.g., 'x' and 'y', in a Registration Accept message. The UE is also sent a RAN Slice area for the Allowed NSSAI and an indication that the configuration (i.e., for reselection priority) is valid within a RAN Slice Area. As long as the UE 205 remains inside this validity area, it can use the slice-to-frequency mapping information for stored cell selection/reselection.

As used herein, a RAN Slice area is defined as a RAN coverage area supported by one or more cells, that supports a particular Slice identified by a Ran-SliceAreaId. In some embodiments, the RAN Slice area is defined to be a part of a registration area, e.g., it can be as large as a registration area or smaller than a registration area. In certain embodiments, the RAN slice area (i.e., validity area) may be same as the list of TAs provided during successful registration or a portion thereof. In one embodiment, the RAN Slice may be the same as RAN notification area. In another embodiment, the RAN Slice area may be a list of cells. Alternatively, the RAN Slice area may be defined as a Public Land Mobile Network ("PLMN") area, etc.

When the UE 205 moves outside the RAN Slice Area, the UE 205 informs the network and the network may provide the UE 205 with new/updated slice-to-frequency mapping information. In certain embodiments, the UE 205 requests a slice-to-frequency mapping table from the network again, e.g., in order to select and/or establish RRC Connection with a cell outside the old RAN Slice area that supports a particular network slice.

Figure 5:
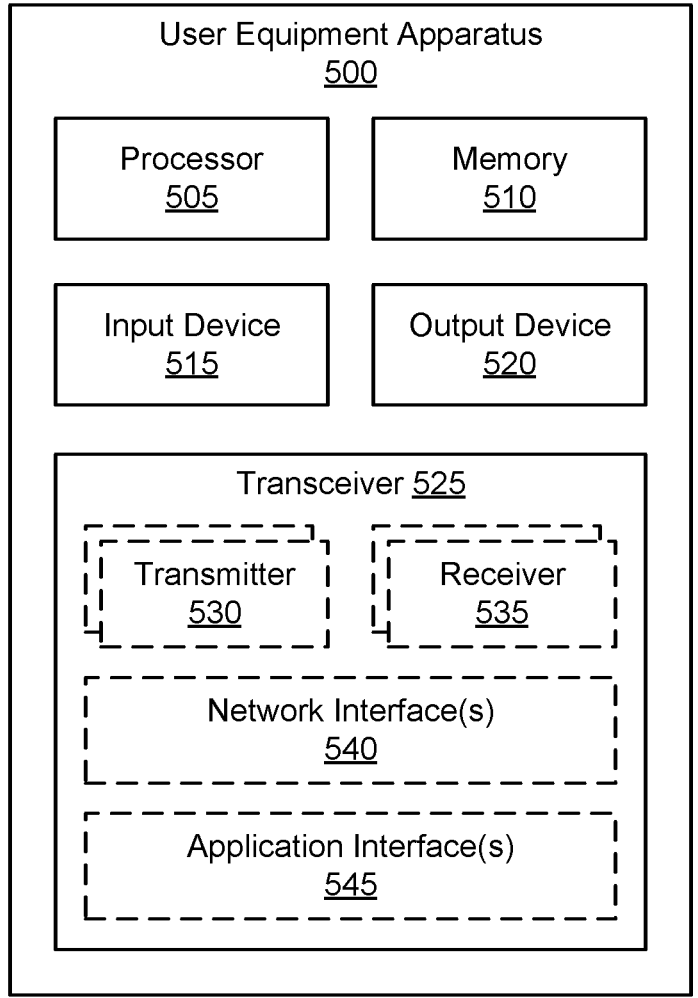
FIG. 5 is a diagram illustrating one embodiment of a user equipment apparatus that may be used for receiving selection assistance information corresponding to a preferred network slice.

FIG. 5 depicts a user equipment apparatus 500 that may be used for performing receiving selection assistance information corresponding to a preferred network slice, according to embodiments of the disclosure. In various embodiments, the user equipment apparatus 500 is used to implement one or more of the solutions described above. The user equipment apparatus 500 may be one embodiment of the remote unit 105 and/or the UE 205, described above. Furthermore, the user equipment apparatus 500 may include a processor 505, a memory 510, an input device 515, an output device 520, and a transceiver 525.

In some embodiments, the input device 515 and the output device 520 are combined into a single device, such as a touchscreen. In certain embodiments, the user equipment apparatus 500 may not include any input device 515 and/or output device 520. In various embodiments, the user equipment apparatus 500 may include one or more of: the processor 505, the memory 510, and the transceiver 525, and may not include the input device 515 and/or the output device 520.

As depicted, the transceiver 525 includes at least one transmitter 530 and at least one receiver 535. In some embodiments, the transceiver 525 communicates with one or more cells (or wireless coverage areas) supported by one or more base units 121. In various embodiments, the transceiver 525 is operable on unlicensed spectrum. Moreover, the transceiver 525 may include multiple UE panels supporting one or more beams. Additionally, the transceiver 525 may support at least one network interface 540 and/or application interface 545. The application interface(s) 545 may support one or more APIs. The network interface(s) 540 may support 3GPP reference points, such as Uu, N1, PC5, etc. Other network interfaces 540 may be supported, as understood by one of ordinary skill in the art.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525.

In various embodiments, the processor 505 controls the user equipment apparatus 500 to implement the above described UE behaviors. In certain embodiments, the processor 505 may include an application processor (also known as "main processor") which manages application-domain and operating system ("OS") functions and a baseband processor (also known as "baseband radio processor") which manages radio functions.

In various embodiments, the processor 505 controls the user equipment apparatus 500 to implement the above described UE behaviors. For example, via the transceiver 525 the processor 505 may receive selection assistance information corresponding to a set of preferred network slices from the mobile communication network. Here, the selection assistance information includes an indication of at least one preferred network slice starting with a most preferred network slice in a priority order. The selection assistance information further contains target cell detection information (i.e., Category 'a' information) or target cell selection information (i.e., Category 'b' information). The processor 505 performs cell search on a highest priority frequency layer corresponding to the most preferred network slice and selects a cell of the highest priority frequency layer that supports the most preferred network slice based on results of the cell search.

In some embodiments, the selection assistance information contains information to detect, measure and evaluate a target cell on the highest priority frequency layer that supports the most preferred network slice. In one embodiment, if the target cell is not the best radio cell on that selected highest priority frequency layer, then the processor 505 chooses (i.e., selects) the next frequency layer—according to the priority order—that supports the most preferred network slice is chosen. In such embodiments, the processor 505 further selects the next preferred network slice—according to the priority order—when there is no lower priority frequency layer that supports the most preferred network slice, and performs cell detection, measurement and evaluation of target cell(s) that support the next most preferred network slice.

In some embodiments, receiving the selection assistance information includes receiving a system broadcast message from a first cell in the mobile communication network. In such embodiments, the selection assistance information includes cell reselection priority information for a specific frequency layer supporting a specific network slice. In certain embodiments, the indication of at least one preferred network slice includes a list of slices supported in or near the first cell and corresponding assistance information for each slice in the list.

In some embodiments, receiving the selection assistance information includes receiving a dedicated signaling message from a first cell in the mobile communication network. In certain embodiments, the indication of at least one preferred network slice includes a list of slices supported in or near the first cell and corresponding assistance information for each slice in the list. In certain embodiments, the selection assistance information is carried in a RRC message or in a NAS message.

In certain embodiments, the dedicated signaling message comprises a RRC redirection message (e.g., a RRCRelease message with RedirectedCarrierInfo) containing an indication that the redirection is to a preferred network slice. In certain embodiments, the dedicated signaling message comprises a RRC release message that comprises the selection assistance information. In some embodiments, the processor 505 reselects a cell that supports a preferred network slice using the selection assistance information.

In some embodiments, the selection assistance information comprises a mapping of each network slice to its corresponding operating frequency/frequencies with the absolute frequency priority of each corresponding operating frequency. In certain embodiments, the mapping of network slices to operating frequencies is valid within a RAN slice area that indicates a RAN coverage area that supports a particular network slice. In such embodiments, the processor 505 may receive (e.g., via the transceiver 525) an indication of the RAN slice area corresponding to the selection assistance information. In further embodiments, the RAN slice area may include a set of cells defining a portion of a registration area in which the mapping of network slices to operating frequencies is valid.

In some embodiments, the selection assistance information (e.g., CRP list) does not include slice information. In such embodiments, the processor 505 interprets a first entry of the selection assistance information as corresponding to the preferred network slice.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media.

In some embodiments, the memory 510 stores data related to receiving selection assistance information corresponding to a preferred network slice. For example, the memory 510 may store various parameters, panel/beam configurations, resource assignments, policies, and the like as described above. In certain embodiments, the memory 510 also stores program code and related data, such as an operating system or other controller algorithms operating on the apparatus 500.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, is designed to output visual, audible, and/or haptic signals. In some embodiments, the output device 520 includes an electronically controllable display or display device capable of outputting visual data to a user. For example, the output device 520 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 520 may include a wearable display separate from, but communicatively coupled to, the rest of the user equipment apparatus 500, such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, the output device 520 may be located near the input device 515.

The transceiver 525 communicates with one or more network functions of a mobile communication network via one or more access networks. The transceiver 525 operates under the control of the processor 505 to transmit messages, data, and other signals and also to receive messages, data, and other signals. For example, the processor 505 may selectively activate the transceiver 525 (or portions thereof) at particular times in order to send and receive messages.

The transceiver 525 includes at least transmitter 530 and at least one receiver 535. One or more transmitters 530 may be used to provide UL communication signals to a base unit 121, such as the UL transmissions described herein. Similarly, one or more receivers 535 may be used to receive DL communication signals from the base unit 121, as described herein. Although only one transmitter 530 and one receiver 535 are illustrated, the user equipment apparatus 500 may have any suitable number of transmitters 530 and receivers 535. Further, the transmitter(s) 530 and the receiver(s) 535 may be any suitable type of transmitters and receivers. In one embodiment, the transceiver 525 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 525, transmitters 530, and receivers 535 may be implemented as physically separate components that access a shared hardware resource and/or software resource, such as for example, the network interface 540.

In various embodiments, one or more transmitters 530 and/or one or more receivers 535 may be implemented and/or integrated into a single hardware component, such as a multi-transceiver chip, a system-on-a-chip, an Application-Specific Integrated Circuit ("ASIC"), or other type of hardware component. In certain embodiments, one or more transmitters 530 and/or one or more receivers 535 may be implemented and/or integrated into a multi-chip module. In some embodiments, other components such as the network interface 540 or other hardware components/circuits may be integrated with any number of transmitters 530 and/or receivers 535 into a single chip. In such embodiment, the transmitters 530 and receivers 535 may be logically configured as a transceiver 525 that uses one more common control signals or as modular transmitters 530 and receivers 535 implemented in the same hardware chip or in a multi-chip module.

Figure 6:
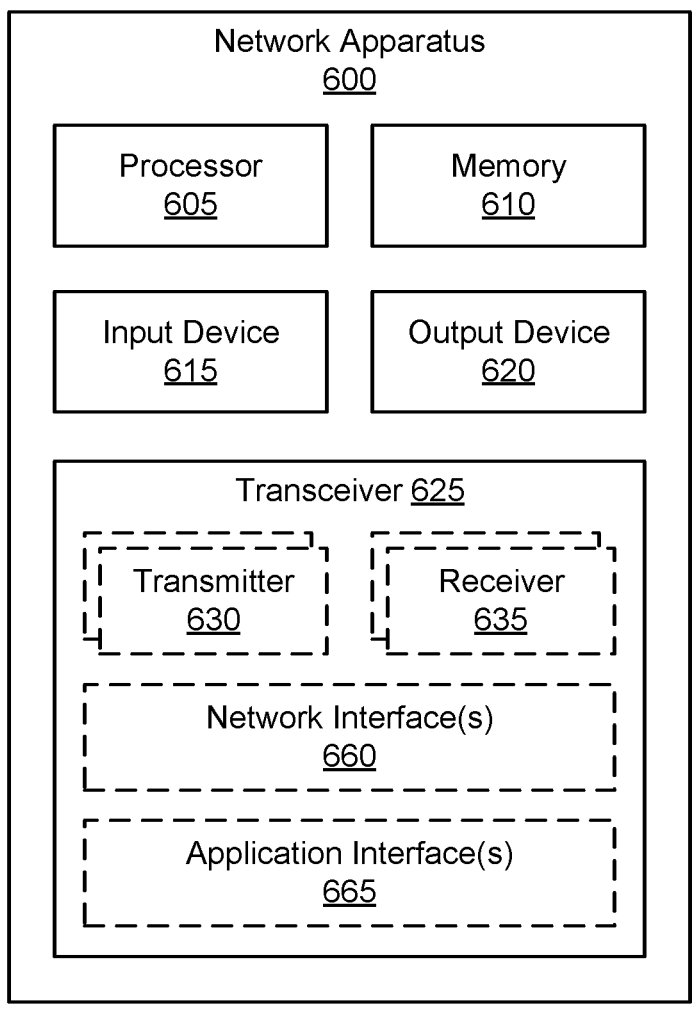
FIG. 6 is a diagram illustrating one embodiment of a network apparatus that may be used for receiving selection assistance information corresponding to a preferred network slice.

FIG. 6 depicts a network apparatus 600 that may be used for performing receiving selection assistance information corresponding to a preferred network slice, according to embodiments of the disclosure. In one embodiment, network apparatus 600 may be one implementation of a RAN node, such as the base unit 121 and/or the RAN node 210, as described above. Furthermore, the base network apparatus 600 may include a processor 605, a memory 610, an input device 615, an output device 620, and a transceiver 625.

In some embodiments, the input device 615 and the output device 620 are combined into a single device, such as a touchscreen. In certain embodiments, the network apparatus 600 may not include any input device 615 and/or output device 620. In various embodiments, the network apparatus 600 may include one or more of: the processor 605, the memory 610, and the transceiver 625, and may not include the input device 615 and/or the output device 620.

As depicted, the transceiver 625 includes at least one transmitter 630 and at least one receiver 635. Here, the transceiver 625 communicates with one or more remote units 65. Additionally, the transceiver 625 may support at least one network interface 640 and/or application interface 645. The application interface(s) 645 may support one or more APIs. The network interface(s) 640 may support 3GPP reference points, such as Uu, N1, N2 and N3. Other network interfaces 640 may be supported, as understood by one of ordinary skill in the art.

The processor 605, in one embodiment, may include any known controller capable of executing computer-readable instructions and/or capable of performing logical operations. For example, the processor 605 may be a microcontroller, a microprocessor, a CPU, a GPU, an auxiliary processing unit, a FPGA, or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the network apparatus 600 is a RAN node (e.g., gNB) that communicates with one or more UEs, as described herein. In such embodiments, the processor 605 controls the network apparatus 600 to perform the above described RAN behaviors. When operating as a RAN node, the processor 605 may include an application processor (also known as "main processor") which manages application-domain and operating system ("OS") functions and a baseband processor (also known as "baseband radio processor") which manages radio functions.

In various embodiments, the network apparatus 600 provides one or more cells on one or more frequency layers. For example, via the transceiver 625 the processor 605 may receiving selection assistance information corresponding to a preferred network slice from the mobile communication network, wherein the selection assistance information comprises an indication of the preferred network slice and at least one of: target cell detection information (i.e., Category 'a' information) and target cell selection information (i.e., Category 'b' information). In one embodiment, the selection assistance information is sent in a broadcast message. In other embodiments, the selection assistance information is sent via dedicated signaling.

In some embodiments, the processor 605 identifies a RAN Slice area (i.e., a validity area) that corresponds to a mapping of network slices to operating frequencies. In such embodiments, the processor 605 may control the transceiver 625 to send the mapping and the RAN Slice area to the UE.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to receiving selection assistance information corresponding to a preferred network slice. For example, the memory 610 may store parameters, configurations, resource assignments, policies, and the like, as described above. In certain embodiments, the memory 610 also stores program code and related data, such as an operating system or other controller algorithms operating on the apparatus 600.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display separate from, but communicatively coupled to, the rest of the network apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, the output device 620 may be located near the input device 615.

The transceiver 625 includes at least transmitter 630 and at least one receiver 635. One or more transmitters 630 may be used to communicate with the UE, as described herein. Similarly, one or more receivers 635 may be used to communicate with network functions in the PLMN and/or RAN, as described herein. Although only one transmitter 630 and one receiver 635 are illustrated, the network apparatus 600 may have any suitable number of transmitters 630 and receivers 635. Further, the transmitter(s) 630 and the receiver(s) 635 may be any suitable type of transmitters and receivers.

FIG. 7 depicts one embodiment of a method 700 for receiving selection assistance information corresponding to a preferred network slice, according to embodiments of the disclosure. In various embodiments, the method 700 is performed by a user equipment device in a mobile communication network, such as the remote unit 105, the UE 205, and/or the user equipment apparatus 500, described above. In some embodiments, the method 700 is performed by a processor, such as a microcontroller, a microprocessor, a CPU, a GPU, an auxiliary processing unit, a FPGA, or the like.

The method 700 begins and receives 705 selection assistance information corresponding to a set of preferred network slices from the mobile communication network. Here, the selection assistance information contains an indication of at least one preferred network slice starting with a most preferred network slice in a priority order. The selection information further contains at least one of: target cell detection information and target cell selection information. The method 700 includes performing 710 cell search on a highest priority frequency layer corresponding to the preferred network slice. The method 700 includes selecting 715 a cell of the highest priority frequency layer that supports the preferred network slice based on results of the cell search. The method 700 ends.

Disclosed herein is a first apparatus for receiving selection assistance information corresponding to a preferred network slice, according to embodiments of the disclosure. The first apparatus may be implemented by a user equipment device in a mobile communication network, such as the remote unit 105, the UE 205, and/or the user equipment apparatus 900, described above. The first apparatus includes a processor and a transceiver that receives selection assistance information corresponding to a set of preferred network slices from the mobile communication network. Here, the selection assistance information includes an indication of at least one preferred network slice starting with a most preferred network slice in a priority order, the selection assistance information further containing target cell detection information or target cell selection information. The processor performs cell search on a highest priority frequency layer corresponding to the most preferred network slice and selects a cell of the highest priority frequency layer that supports the most preferred network slice based on results of the cell search.

In some embodiments, the selection assistance information comprises information to detect, measure and evaluate a target cell on the highest priority frequency layer that supports the most preferred network slice. In some embodiments, receiving the selection assistance information comprises receiving a system broadcast message from a first cell in the mobile communication network. In such embodiments, the selection assistance information comprises cell reselection priority information for a specific frequency layer supporting a specific network slice. In certain embodiments, the indication of at least one preferred network slice includes a list of slices supported in or near the first cell and corresponding assistance information for each slice in the list.

In some embodiments, receiving the selection assistance information comprises receiving a dedicated signaling message from a first cell in the mobile communication network. In certain embodiments, the indication of at least one preferred network slice includes a list of slices supported in or near the first cell and corresponding assistance information for each slice in the list. In certain embodiments, the selection assistance information is carried to the apparatus in a RRC message or in a NAS message.

In certain embodiments, the dedicated signaling message comprises a RRC redirection message containing an indication that the redirection is to a preferred network slice. In certain embodiments, the dedicated signaling message comprises a RRC release message that comprises the selection assistance information. In some embodiments, the processor reselects a cell that supports a preferred network slice using the selection assistance information.

In some embodiments, the selection assistance information comprises a mapping for each of the preferred network slices to their corresponding operating frequencies with their absolute frequency priority. In certain embodiments, the mapping of network slices to operating frequencies is valid within a RAN slice area that indicates a RAN coverage area that supports a particular network slice. In such embodiments, the processor may receive (e.g., via the transceiver) an indication of the RAN slice area corresponding to the selection assistance information. In further embodiments, the RAN slice area may include a set of cells defining a portion of a registration area in which the mapping of network slices to operating frequencies is valid.

In some embodiments, the selection assistance information does not include slice information. In such embodiments, the processor interprets a first entry of the selection assistance information as corresponding to the preferred network slice.

Disclosed herein is a first method for receiving selection assistance information corresponding to a preferred network slice, according to embodiments of the disclosure. The first method may be performed by a user equipment device in a mobile communication network, such as the remote unit 105, the UE 205, and/or the user equipment apparatus 900. The first method includes receiving selection assistance information corresponding to a set of preferred network slices from the mobile communication network. Here, the selection assistance information contains an indication of at least one preferred network slice starting with a most preferred network slice in a priority order, the selection assistance information further containing at least one of: target cell detection information and target cell selection information. The first method includes performing cell search on a highest priority frequency layer corresponding to the most preferred network slice and selecting a cell of the highest priority frequency layer that supports the most preferred network slice based on results of the cell search.

In some embodiments, the selection assistance information comprises information to detect, measure and evaluate a target cell on the highest priority frequency layer that supports the most preferred network slice. In some embodiments, receiving the selection assistance information comprises receiving a system broadcast message from a first cell in the mobile communication network. In such embodiments, the selection assistance information contains cell reselection priority information for a specific frequency layer supporting a specific network slice. In certain embodiments, the indication of at least one preferred network slice includes a list of slices supported in or near the first cell and corresponding assistance information for each slice in the list.

In some embodiments, receiving the selection assistance information includes receiving a dedicated signaling message from a first cell in the mobile communication network. In certain embodiments, the indication of at least one preferred network slice includes a list of slices supported in or near the first cell and corresponding assistance information for each slice in the list. In certain embodiments, the selection assistance information is carried to the apparatus in a RRC message or in a NAS message.

In certain embodiments, the dedicated signaling message includes a RRC redirection message containing an indication that the redirection is to a preferred network slice. In certain embodiments, the dedicated signaling message comprises a RRC release message that comprises the selection assistance information, the method further comprising reselecting a cell that supports a preferred network slice using the selection assistance information.

In some embodiments, the selection assistance information comprises a mapping for each of the preferred network slices to their corresponding operating frequencies with their absolute frequency priority. In certain embodiments, the mapping of network slices to operating frequencies is valid within a RAN slice area that indicates a RAN coverage area that supports a particular network slice. In such embodiments, the first method further includes receiving an indication of the RAN slice area corresponding to the selection assistance information. In further embodiments, the RAN slice area comprises a set of cells defining a portion of a registration area in which the mapping of network slices to operating frequencies is valid.

In some embodiments, the selection assistance information does not include slice information. In such embodiments, the UE interprets a first entry of the selection assistance information as corresponding to the preferred network slice.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment ("UE"), the method comprising:

receiving selection assistance information corresponding to a set of preferred network slices from a mobile communication network supporting a plurality of network slices, wherein the selection assistance information comprises an indication of priorities of the plurality of network slices and a mapping between a respective network slice and a frequency layer that supports the respective network slice, wherein the selection assistance information further comprises target cell detection information or target cell selection information, and wherein the selection assistance information comprises information to detect, measure, and evaluate a target cell on a highest priority frequency layer that supports a preferred network slice;

performing cell search on a highest priority frequency layer corresponding to the preferred network slice; and reselecting a cell of the highest priority frequency layer that supports the preferred network slice based on results of the cell search.

2. The method of claim 1, wherein receiving the selection assistance information comprises receiving a system broadcast message from a first cell in the mobile communication network, wherein the selection assistance information comprises cell reselection priority information for a specific frequency layer supporting a specific network slice.

3. The method of claim 2, wherein the system broadcast message includes a list of network slices supported in or near the first cell and corresponding selection assistance information for each slice in the list.

4. The method of claim 1, wherein receiving the selection assistance information comprises receiving a dedicated signaling message from a first cell in the mobile communication network.

5. The method of claim 4, wherein the dedicated signaling message comprises a radio resource control ("RRC") redirection message comprising an indication that the redirection is to a preferred network slice.

6. The method of claim 4, wherein the dedicated signaling message comprises a radio resource control ("RRC") release message that comprises the selection assistance information, the method further comprising reselecting a cell that supports a preferred network slice using the selection assistance information.

7. The method of claim 4, wherein the selection assistance information is carried to the UE in a radio resource control ("RRC") message or in a non-access stratum ("NAS") message.

8. The method of claim 1, wherein the mapping is valid within a radio access network ("RAN") slice area that indicates a RAN coverage area that supports a particular network slice, the method further comprising receiving an indication of the RAN slice area corresponding to the selection assistance information.

9. The method of claim 8, wherein the RAN slice area comprises a set of cells defining a portion of a registration area in which the mapping is valid.

10. The method of claim 1, wherein the selection assistance information does not include slice information, wherein the UE interprets a first entry of the selection assistance information as corresponding to the preferred network slice.

11. A user equipment ("UE") for wireless communication, comprising:

at least one memory;

at least one processor coupled with the at least one memory and configured to cause the UE to:

receive selection assistance information corresponding to a set of preferred network slices from a mobile communication network supporting a plurality of network slices, wherein the selection assistance information comprises an indication of priorities of the plurality of network slices and a mapping between a respective network slice and a frequency layer that supports the respective network slice, wherein the selection assistance information further comprises target cell detection information or target cell selection information, and wherein the selection assistance information comprises information to detect, measure, and evaluate a target cell on a highest priority frequency layer that supports a preferred network slice;

perform cell search on a highest priority frequency layer corresponding to the preferred network slice; and reselect a cell of the highest priority frequency layer that supports the preferred network slice based on results of the cell search.

12. The UE of claim 11, wherein, to receive the selection assistance information, the at least one processor is configured to cause the UE to receive a system broadcast message from a first cell in the mobile communication network, wherein the selection assistance information comprises cell reselection priority information for a specific frequency layer supporting a specific network slice.

13. The UE of claim 12, wherein the system broadcast message includes a list of network slices supported in or near the first cell and corresponding selection assistance information for each slice in the list.

14. The UE of claim 11, wherein, to receive the selection assistance information, the processor is configured to cause the UE to receive a dedicated signaling message from a first cell in the mobile communication network.

15. The UE of claim 14, wherein the selection assistance information is carried in a Radio Resource Control ("RRC") message or in a Non-Access Stratum ("NAS") message.

16. The UE of claim 11, wherein the mapping is valid within a radio access network ("RAN") slice area that indicates a RAN coverage area that supports a particular network slice.

17. The UE of claim 16, wherein the processor is further configured to cause the UE to receive an indication of the RAN slice area corresponding to the selection assistance information, wherein the RAN slice area comprises a set of cells defining a portion of a registration area in which the mapping is valid.

\* \* \* \* \*